United States Patent [19]

Petersen

[11] Patent Number: 5,130,928
[45] Date of Patent: Jul. 14, 1992

[54] ANTI-LOCK AND/OR ANTI-SLIP APPARATUS FOR COMMERCIAL-TYPE VEHICLES

[75] Inventor: Erwin Petersen, Wunstorf, Fed. Rep. of Germany

[73] Assignee: WABCO Westinghouse Fahrzeugbremsen GmbH, Hanover, Fed. Rep. of Germany

[21] Appl. No.: 420,501

[22] Filed: Oct. 12, 1989

[30] Foreign Application Priority Data

Oct. 21, 1988 [DE] Fed. Rep. of Germany ....... 3835906

[51] Int. Cl.⁵ .............................................. B60T 8/32
[52] U.S. Cl. .................. 364/426.02; 180/197; 303/103
[58] Field of Search ........... 364/426.01, 426.02, 364/426.03; 303/93, 95, 96, 102, 103, 111; 180/197

[56] References Cited

U.S. PATENT DOCUMENTS

| | | | |
|---|---|---|---|
| 4,460,220 | 7/1984 | Petersen | 303/111 |
| 4,583,611 | 4/1986 | Frank et al. | 364/426.03 |
| 4,677,557 | 6/1987 | Stumpe | 364/426.01 |
| 4,933,857 | 6/1990 | Hashiguchi et al. | 364/426.03 |
| 4,943,922 | 7/1990 | Tanaka | 303/102 |
| 4,961,145 | 10/1990 | Gernot | 364/426.02 |

FOREIGN PATENT DOCUMENTS

3614863 11/1987 Fed. Rep. of Germany.
3700716 7/1988 Fed. Rep. of Germany.

Primary Examiner—Gary Chin
Attorney, Agent, or Firm—Horst M. Kasper

[57] ABSTRACT

This invention provides an anti-lock and/or an anti-slip apparatus for commercial-type vehicles, in which there is a front axle and two live rear axles. The apparatus includes an electronic system as part of the anti-lock and/or anti-slip system. Such electronic system is preferably a four-channel system. To improve the quality of regulation during acceleration and braking, there is an additional speed sensor for the direct or indirect monitoring of the angular velocity of the cardan shaft. The electronic system determines whether the rotational speed of the cardan shaft varies from the average speed of the monitored wheels (vehicle reference speed). If a variance is determined, the electronic system activates measures for an alarm indicator, the regulation of the retarder acting on the drive train and/or for the synchronization and subsequent locking of the longitudinal differential.

51 Claims, 1 Drawing Sheet

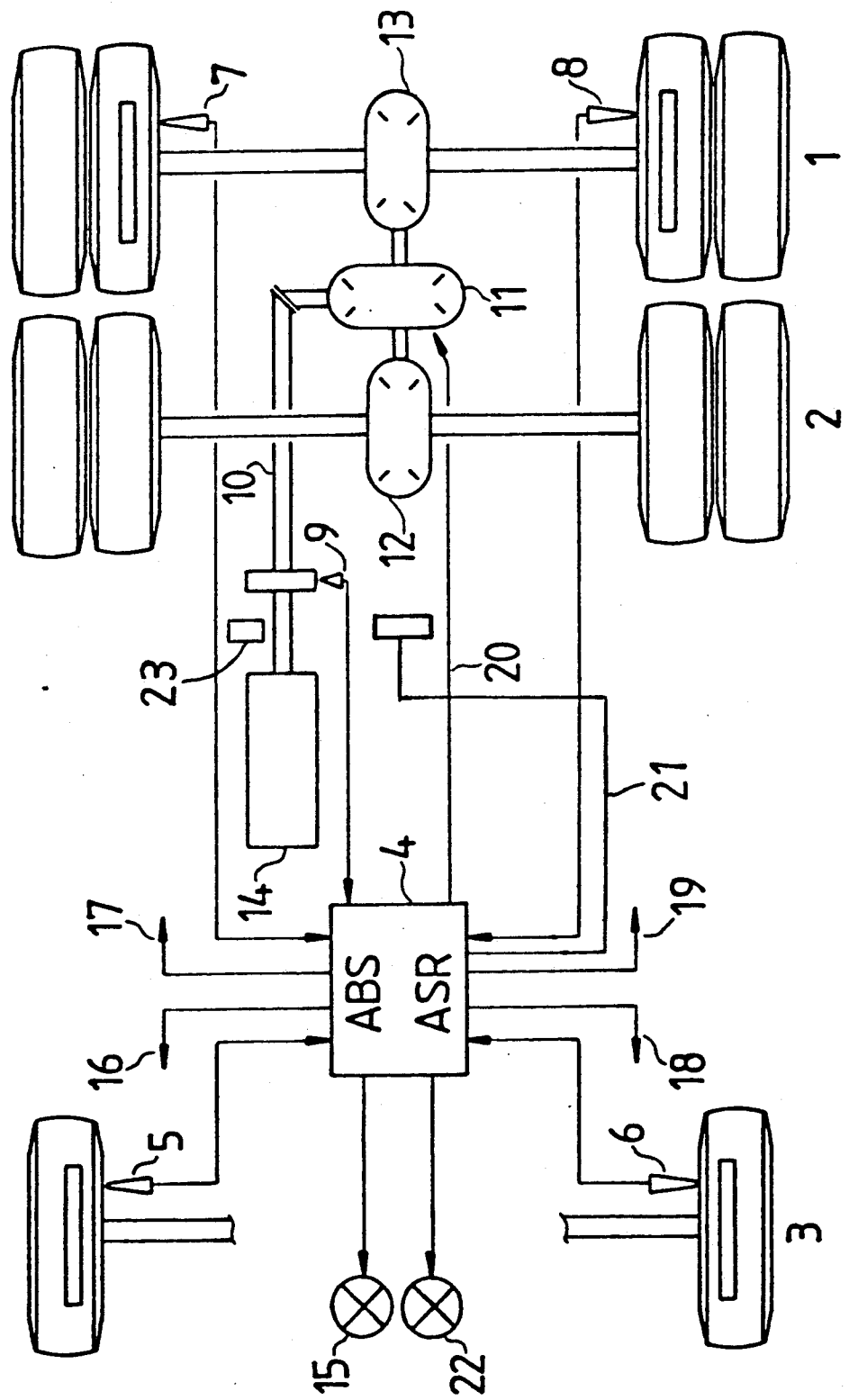

ANTI-LOCK AND/OR ANTI-SLIP APPARATUS
FOR COMMERCIAL-TYPE VEHICLES

FIELD OF THE INVENTION

The present invention relates, in general, to commercial vehicle brake systems and, more particularly, this invention relates to an improved commercial-type vehicle anti-lock and/or anti-slip apparatus for use with such brake system.

BACKGROUND OF THE INVENTION

It should be understood that a system to prevent vehicle brakes from locking is also known in the braking art as an "anti-lock brake system". Further, an anti-slip system is known in the motor vehicle art as a "drive-slip regulation system". Prior to the present invention, in German patent publication DE-OS 37 00 716, a commercial vehicle equipped with a four-channel anti-lock brake system (ABS) and an anti-slip system (ASR) has been disclosed. However, the vehicle disclosed in this prior art reference is equipped with only a single live rear axle, as well as a non-powered front axle and a trailing rear axle. In this ABS and ASR system, the two wheels on the driven axle are scanned by means of speed sensors. However, for reasons of economy, the electronic system provided has only four channels. Consequently, the two wheels associated with the non-powered axles cannot be directly monitored. Therefore, steps must be taken to protect these unmonitored wheels against undesirably excessive slipping or locking during a respective running of or brake application on the vehicle.

German patent publication DE-OS 36 14 863 also discloses an apparatus in which the automatic insertion of a transverse differential lock, following a slip signal (positive slip) of a driven wheel, is achieved. Such a transverse differential lock, as taught in the prior art, produces a positive connection of the pair of wheels on an axle. As a result, the traction force which can be produced by this particular axle can thereby be increased.

On commercial vehicles equipped with two live rear axles, of the type described above, the transverse differentials of the two live axles are connected by a longitudinal differential disposed therebetween. In this manner, a drive torque of such commercial vehicle will be transmitted via a cardan shaft connected to the above-mentioned longitudinal differential. It will be recognized that if a four-channel electronic system is used, such as taught in such prior art, then only the wheels positioned on one of the live axles will be monitored. Consequently, in such prior art systems, the two drive wheels on each side are supplied with the same ABS-regulated brake pressure.

Additionally, if during acceleration and/or during a brake application under unfavorable driving conditions, such as, slippery roads, one wheel or both wheels of the unmonitored axle may either slip or lock, this undesirable and potentially hazardous condition will not be detected by the two rear wheel channels of the electronic system which has only four channels. However, prior to the present invention, to overcome this disadvantage would require switching to a six-channel electronic system. Obviously, such six-channel electronic system entails increased equipment costs. Such increased costs are incurred due to additional sensors and other electronic components.

SUMMARY OF THE INVENTION

The present invention provides an anti-lock and/or anti-slip apparatus for commercial-type vehicles which have a front axle and a pair of live rear axles. Such apparatus includes an electronic system. The electronic system of the anti-lock and/or anti-slip system monitors t wheels associated with one of such pair of driven axles. Such monitoring of the speeds is accomplished by rotational speed sensing means which transmit signal values to such electronic system. An additional sensing means is provided to monitor either directly or indirectly the rotational speed of the cardan shaft. The signal value of this additional sensing means is also transmitted to the electronic system. The electronic system evaluates whether the rotational speed of the cardan shaft, taking into consideration a constant translation factor, differs from the average rotational speed of the monitored wheels. When the electronic system detects a variance, at least one of an alarm is triggered to inform the driver, and other appropriate measures are taken to synchronize the rotational speed of the cardan shaft and the rotational speeds of the monitored drive wheels by such electronic system.

OBJECTS OF THE INVENTION

It is, therefore, one of the primary objects of the present invention to provide an anti-lock and/or anti-slip apparatus for commercial-type vehicles which achieves an increase in the quality of regulation during both an acceleration and deceleration of such vehicle.

Another object of the present invention is to provide an anti-lock and/or anti-slip apparatus for commercial-type vehicles which achieves enhanced quality of regulation without significantly adding to the complexity of such apparatus.

Still another object of the present invention is to provide an anti-lock and/or anti-slip apparatus for commercial-type vehicles which achieves enhanced quality of regulation without significantly adding to the cost of such apparatus.

A further object of the present invention is to provide an anti-lock and/or anti-slip apparatus for commercial-type vehicles which is capable of indirectly monitoring the pair of drive wheels which are not monitored directly by such apparatus.

In addition to the objects and advantages of the anti-lock and/or anti-slip apparatus described above, various other objects and advantages of the present invention will become more readily apparent to those persons skilled in the vehicle art from the following more detailed description of the invention when such description is taken in conjunction with the single drawing Figure and with the appended claims.

BRIEF DESCRIPTION OF THE DRAWING

The single Figure shown is a simplified schematic presentation of the mechanical and the electrical block circuit diagram of a commercial-type vehicle.

BRIEF DESCRIPTION OF THE INVENTION

Now referring more particularly to the drawing, there is schematically illustrated therein a commercial-type vehicle equipped with a pair of live rear axles designated 1 and 2, and a single front axle designated 3. As used hereinafter in the specification and claims, the term "live axle" means an axle that is driven or is at least capable of being driven.

The anti-lock and/or anti-slip apparatus for use in such commercial-type vehicle, according to the presently preferred embodiment of this invention, includes a four-channel electronic system 4 positioned on such commercial-type vehicle. In the invented anti-lock brake system (ABS) and anti-slip system (ASR), the electronic system 4, at a number of input terminals located thereon, receives electrical signals communicated by wheel speed sensors 5 and 6 positioned adjacent a respective wheel on the front axle and by wheel speed sensors 7 and 8 positioned adjacent a respective wheel on one of the live rear axles, illustrated in the drawing as the rear live axle 1. The electrical signals communicated to the input terminals of the electronic system 4 by the wheel speed sensors 5, 6, 7 and 8 have a signal value that is representative of the speed of rotation of their respective wheel. Although not preferred, it should be noted that it is within the scope of the present invention to use only a two-channel electronic system. However, it is to be understood that when such two-channel electronic system is used, the wheel speed sensors 5 and 6 associated with the wheels on the front axle are not provided. In other words, the front wheels are not monitored.

The presently preferred embodiment of the invention includes an additional speed sensor 9 positioned on such commercial-type vehicle adjacent the cardan shaft 10. Such speed sensor 9 monitors the rotational speed of the cardan shaft 10 and communicates an electrical signal value representative of such rotational speed of the cardan shaft 10 to another input terminal of such electronic system 4. In a commercial-type vehicle, such cardan shaft 10 is driven by a drive system designated 14 in the drawing. As used herein, the drive system 14 includes the engine and transmission, as well as the clutch when a manual transmission is used. The additional speed sensor 9 is illustrated in a position adjacent the output of such drive system, but such speed sensor 9 can also be installed adjacent the longitudinally disposed differential 11.

Instead of the additional speed sensor 9, it is within the scope of the present invention to utilize the speed signal which would already be available from the tachometer (not shown) o such commercial-type vehicle. It is understood, however, that such speed signal from the tachometer must be proportional to the rotational speed of the cardan shaft 10. It is customary for this to be the case.

In another alternative embodiment of the present invention, the average speed of the drive wheels, which are not monitored directly in the vicinity of the transverse differential 12 associated with the live rear axle 2, can also be monitored with an additional sensor (not shown). In this alternative embodiment, this additional sensor would then monitor the input speed of such transverse differential 12. In other words, an "indirect" monitoring of the rotational speed of the cardan shaft 10 would be achieved by this additional sensor.

The electronic system 4 includes a plurality of output terminals to which a first end of a number of output lines 16, 17, 18 and 19 are connected. The second end of such output lines 16, 17, 18 and 19 is connected to a respective solenoid control valve (not shown) of a respective monitored wheel 5, 6, 7 and 8. As is known by persons skilled in the art, control signals are communicated from the electronic system 4 to the solenoid control valves over these output lines 16, 17, 18 and 19. Additional outputs of the electronic system 4 can be used, for example, to activate an alarm or indicator designated 15 and 22. Such alarm or indicator will preferably be designed as a warning light or an acoustical signal which is located within the confines of the vehicle cab. By means of an additional output 21, the braking action of a retarder 23 or an engine brake (not shown) acting on the cardan shaft 10 can be disconnected.

The wheels associated with a respective one of the pair of live rear axles 1 and 2 are connected to one another as in conventional prior art practice, i.e., each by means of a respective transverse differential 12 and 13. The drive of the two transverse differentials 12 and 13 is accomplished in a commercial-type vehicle by means of the longitudinal differential 11. Such longitudinal differential 11, in turn, is driven by the cardan shaft 10 connected thereto and connected to the drive system 14. In the present invention, such longitudinal differential 11 can be locked by means of an electrical signal being communicated thereto from the electronic system 4 over a separate output line 20.

The particular mechanical configuration of the various individual differentials 11, 12 and 13 as well as the particular locking device used for the longitudinal differential 11 do not form a part of the present invention per se. Furthermore, because these particular components are generally well known in the commercial vehicle art, they will not be described here in any greater detail.

The operation of the presently preferred anti-lock and/or anti-slip apparatus, according to the present invention, will now be described in greater detail below.

During a non-braked travel period, or during an unregulated deceleration period, or during an unregulated acceleration period of such commercial-type vehicle, the drive wheels positioned thereon will generally exhibit only a very slight slip. Consequently, the cardan shaft 10 rotates at a substantially constant speed in relationship with the wheels of the pair of rear drive axles 1 and 2.

However, these speed ratios will change if, for example, unfavorable road conditions are encountered and there is either a controlled braking action or a controlled acceleration initiated by an operator of such commercial-type vehicle. Such unfavorable road conditions at least include, for example, snow and/or ice covering the surface of such road. In this case, the monitored wheels of the rear drive axle 1 will exhibit significantly higher slip values. These higher slip values are analyzed and adjusted in the electronic system 4. In the case of a regulated braking, for example, these slip values may be up to 20 percent higher. On the other hand, the average slip value will be approximately 6 percent higher in the case of a regulated acceleration of such commercial-type vehicle.

In both of the above-mentioned cases, however, the slip values of the two unmonitored wheels on the rear drive axle 2 can increase up to a value equal to 100 percent negative slip or up to relatively high positive slip values without any direct detection of this detrimental condition by the electronic system 4.

The negative slip discussed above occurs when a wheel locks, and the positive slip discussed above occurs when a wheel slips during an acceleration phase of such commercial-type vehicle. These undesirable and- /or potentially hazardous operating conditions can be detected, however, by means of the anti-lock and/or anti-slip apparatus constructed and operated according to the present invention. This detection is possible because the electronic system 4 also evaluates the rotational speed of the cardan shaft 10 or the drive angular velocity of the transverse differential 12 associated with the unmonitored rear drive axle 2.

In such electronic system 4, for example, a distinction can be readily determined between two possible cases. In the first case, if it is determined in the electronic system 4 that the cardan shaft 10 is rotating faster than the average rotational speeds of the pair of monitored wheels, then at least one of the drive wheels not being monitored on the rear drive axle 2 is slipping. In the second case, if such cardan shaft 10 is determined by the electronic system 4 to be rotating more slowly than such average rotational speeds of the pair of monitored wheels, then at least one of the drive wheels positioned on the unmonitored rear drive axle 2 either has an excessive brake slip or is locked. Because these two special cases can be readily determined by the electronic system 4, appropriate corrective action can be initiated by the anti-lock and/or anti-slip apparatus of this invention. If the cardan shaft 10 is rotating too slowly, for example, these corrective measures may include one or more of the following:
1) the illumination of an ABS warning light in the cab portion of such commercial-type vehicle;
2) the elimination of braking action of retarded wheel;
3) the activation of a brake pressure reduction for the unmonitored wheels, achievement of such brake pressure reduction being known in the prior art; and/or
4) the synchronization and insertion of a differential pawl (not shown, but which will be described below) into the longitudinal differential 11.

If, on the other hand, such cardan shaft 10 is rotating too rapidly, these corrective measures include lighting the ASR indicator lamp and/or ensuring that there is a synchronization and insertion of the differential pawl into the longitudinal differential 11.

The locking of the longitudinal differential 11 with such differential pawl is advantageously accomplished only at low speeds. Such low speeds being, for example, up to about 30 km/hr. During an acceleration stage of such commercial-type vehicle, the steps required for synchronization of the longitudinal differential 11 advantageously include a reduction of the drive power. As soon as an operating condition is achieved in such commercial-type vehicle in which the rotational speed of the wheels is equal to the rotational speed of the cardan shaft 10, the differential pawl of the longitudinal differential 11 can be inserted and the engine power can be automatically increased once again.

During a braking application on such commercial-type vehicle, the corrective measures for synchronization of the longitudinal differential 11 will advantageously include a regulated reduction in the brake pressure being applied. This regulated reduction in the brake pressure being applied results in the slip values of the monitored wheels on the rear drive axle 1 being initially reduced to very low values for a short period of time. In a presently preferred operation of the invented anti-lock and/or anti-slip apparatus, as soon as the rotational speed of the cardan shaft 10 is synchronized sufficiently with the rotational speeds of the monitored wheels on the rear drive axle 1, the differential pawl is engaged with the longitudinal differential 11 once again. Thereafter, the wheels are once again braked for optimum slip. In the case under discussion, the differential pawl should remain engaged with the longitudinal differential substantially until the end of the brake application on such commercial-type vehicle.

With the anti-lock and/or anti-slip apparatus of the present invention, it is also possible to maintain the locking of the longitudinal differential 11 by the differential pawl only for a predetermined period of time, if desired. In any of the cases being discussed, during the time such longitudinal differential 11 is locked by the differential pawl, it is advantageous to have the alarm 15 located in the cab activated by the electronic system 4, thereby alerting the operator of this condition.

By means of the present anti-lock and/or anti-slip apparatus, according to the present invention, it is clear that the invention provides an improvement in both the ABS function and the ASR function as compared to conventional four-channel prior art systems. Additionally, these improvements are achieved with a lower cost than for a more complex six-channel system. In particular, the locking and/or slipping of the unmonitored wheels is substantially prevented.

The electronic system 4 can advantageously include a microprocessor to carry out many of the required determinations discussed above, such microprocessor being easily programmable by a skilled computer programmer from the operating description provided above.

While the presently preferred embodiment and a number of alternative embodiments of the anti-lock and/or anti-slip apparatus, according to the present invention, have been described in detail above, it should be obvious to persons skilled in the commercial-type vehicle braking art that various additional modifications and adaptations of such invention can be made without departing from the spirit and scope of the appended claims.

I claim:
1. An apparatus for use on a commercial-type vehicle having a front axle and a pair of rear drive axles which substantially minimize a time duration of at least one of a locking and a slipping of wheels mounted on said front axle and said pair of rear drive axles, said apparatus comprising:
(a) a first pair of speed sensing means, with each said speed sensing means positioned on said commercial-type vehicle adjacent a respective wheel mounted on a first predetermined one of said pair of rear drive axles for determining a rotational speed of each said respective wheel on said first predetermined one of said pair of rear drive axles and for furnishing electrical signal having a value that is representative of said rotational speed;
(b) a means positioned on said commercial-type vehicle for indirectly determining an average rotational speed of said wheels mounted on a second predetermined one of said pair of rear drive axles and for furnishing electrical signal having a value that is representative of said average rotational speed; and
(c) an electronic system positioned on said commercial-type vehicle and connected to receive at individual input terminals thereof said electrical signal from each of said first pair of speed sensing means and connected to receive at another input terminal thereof said electrical signal from said means for determining said average rotational speed of said wheels mounted on said second predetermined one of said pair of rear drive axles, said electronic sys- tem determining from said electrical signals furnished thereto when said at least one of said locking and slipping of said wheels occurs and said electronic system at an output terminal thereof furnishing at least one appropriate electrical signal to a means positioned in a cab of said commercial-type vehicle for alerting an operator of said commercial-type vehicle of said at least one of said locking and slipping of said wheels, and to a means positioned on said commercial-type vehicle for initiating appropriate automatic measures to substantially minimize time duration of said at least one of said locking and slipping of said wheels by controlling braking action on said wheels as appropriate.

2. An apparatus, according to claim 1, wherein said apparatus further includes a second pair of speed sensing means with each said speed sensing means positioned on said commercial-type vehicle adjacent a respective wheel mounted on said front axle for determining a rotational speed of each said respective wheel on said front axle and for furnishing an electrical signal having a value that is representative of said rotational speed to said individual input terminals of said electronic system.

3. An apparatus, according to claim 1, wherein said means for determining said average rotational speed of said wheels mounted on said second predetermined one of said pair of rear drive axles and for furnishing said electrical signal having said value representative of said average rotational speed to said electronic system is a speed sensing means for determining a rotational speed of a cardan shaft connected to a drive system on said commercial-type vehicle.

4. An apparatus, according to claim 3, wherein said electronic system takes into consideration a constant translation factor relating a speed of one of said wheels associated with said first predetermined one of said pair of rear axles to a speed of a cardan shaft to evaluate whether said rotational speed of said cardan shaft differs from an average rotational speed of said first predetermined one of said pair of rear drive axles.

5. An apparatus, according to claim 2, wherein said means for determining said average rotational speed of said wheels mounted on said second predetermined one of said pair of rear drive axles and for said electrical signal having said value representative of said average rotational speed to said electronic system is a speed sensing means for determining a rotational speed of a cardan shaft connected to a drive system on said commercial-type vehicle, and wherein said electronic system takes into consideration a constant translation factor relating to the rotational speed of said cardan shaft and the rotational speed of the first predetermined one of said pair of rear drive axles to evaluate whether said rotational speed of said cardan shaft differs from an average rotational speed of said first predetermined one of said pair of rear drive axles.

6. An apparatus, according to claim 1, wherein said means for alerting said operator is at least one of a light indicating said locking of said wheels and a light indicating said slipping of said wheels.

7. An apparatus, according to claim 2, wherein said means for alerting said operator is at least one of a light indicating said locking of said wheels and a light indicating said slipping of said wheels.

8. An apparatus, according to claim 5, wherein said means for alerting said operator is at least one of a light indicating said locking of said wheels and a light indicating said slipping of said wheels.

9. An apparatus according to claim 3, wherein said electronic system furnishes said appropriate electrical signal to a retarder means positioned on said commercial-type vehicle which eliminates a decelerating action by said retarder means when said rotational speed of said cardan shaft is too slow.

10. An apparatus according to claim 5, wherein said electronic system furnishes said appropriate electrical signal to a retarder means positioned on said commercial-type vehicle which eliminates a decelerating action by said retarder means when said rotational speed of said cardan shaft is too slow.

11. An apparatus according to claim 3, wherein said electronic system furnishes said appropriate electrical signal to a means for reducing a braking action on a pair of operating brakes associated with said second predetermined one of said pair of rear drive axles in relationship to a braking action on said first predetermined one of said pair of rear drive axles when said rotational speed of said cardan shaft is too slow.

12. An apparatus, according to claim 5, wherein said electronic system furnishes said appropriate electrical signal to a means for reducing a braking action on a pair of operating brakes associated with said second predetermined one of said pair of rear drive axles in relationship to a braking action on said first predetermined one of said pair of rear drive axles when said rotational speed of said cardan shaft is too slow.

13. An apparatus, according to claim 1, wherein said apparatus further includes a means for retaining a manual activation capability for a differential pawl engageable with a longitudinal differential positioned on said commercial-type vehicle when a cardan shaft connected to both a drive system for said commercial-type vehicle and the rear drive axles, is rotating either too slow or too fast.

14. An apparatus, according to claim 1, wherein said electronic system furnishes an electrical signal which synchronizes said rotational speed of each of said wheels on said second predetermined one of said pair of rear drive axles with said rotational speed of each of said wheels on said first predetermined one of said pair of rear drive axles and said electronic system further furnishes an electrical control signal to a means positioned on said commercial-type vehicle for automatically locking a longitudinal differential positioned on said commercial-type vehicle once said synchronization is achieved.

15. An apparatus, according to claim 2, wherein said electronic system furnishes and electrical signal for automatically locking a longitudinal differential positioned on said commercial-type vehicle after synchronization between said rotational speed of each of said wheels mounted on said first predetermined one of said pair of rear drive axles and said rotational speed of each of said wheels mounted on said second predetermined one of said pair of rear drive axles is achieved.

16. An apparatus, according to claim 5, wherein said electronic system furnishes an electrical signal for automatically locking a longitudinal differential positioned on said commercial-type vehicle after synchronization between said rotational speed of each of said wheels mounted on said first predetermined one of said pair of rear drive axles and said rotational speed of each of said wheels mounted on said second predetermined one of said pair of rear drive axles is achieved.

17. An apparatus, according to claim 8, wherein said electronic system furnishes an electrical signal for automatically locking a longitudinal differential positioned on said commercial-type vehicle after synchronization between said rotational speed of each of said wheels mounted on said first predetermined one of said pair of rear drive axles and said rotational speed of each of said wheels mounted on said second predetermined one of said pair of rear drive axles is achieved.

18. An apparatus, according to claim 10, wherein said electronic system furnishes an electrical signal for automatically locking a longitudinal differential positioned on said commercial-type vehicle after synchronization between said rotational speed of each of said wheels mounted on said first predetermined one of said pair of rear drive axles and said rotational speed of each of said wheels mounted on said second predetermined one of said pair of rear drive axles is achieved.

19. An apparatus, according to claim 13, wherein said electronic system furnishes an electrical signal for automatically locking a longitudinal differential positioned on said commercial-type vehicle after synchronization between said rotational speed of each of said wheels mounted on said first predetermined one of said pair of rear drive axles and said rotational speed of each of said wheels mounted on said second predetermined one of said pair of rear drive axles is achieved.

20. An apparatus, according to claim 1, wherein during acceleration of said commercial-type vehicle, said electronic system furnishes an electrical signal for reducing drive power of a drive system to enable synchronizing the wheel speeds associated with a longitudinal differential positioned on said commercial-type vehicle.

21. An apparatus, according to claim 2, wherein during acceleration of said commercial-type vehicle, said electronic system furnishes an electrical signal to valve means for reducing drive power of a drive system to enable synchronizing the wheel speeds associated with a longitudinal differential positioned on said commercial-type vehicle.

22. An apparatus, according to claim 5, wherein during acceleration of said commercial-type vehicle, said electronic system furnishes an electrical signal to actuator means for reducing drive power of a drive system to enable synchronizing the wheel speeds associated with a longitudinal differential positioned on said commercial-type vehicle.

23. An apparatus, according to claim 8, wherein during acceleration of said commercial-type vehicle, said electronic system furnishes an electrical signal to actuator means for reducing drive power of a drive system to enable synchronizing the wheel speeds associated with a longitudinal differential positioned on said commercial-type vehicle.

24. An apparatus, according to claim 10, wherein during acceleration of said commercial-type vehicle, said electronic system furnishes an electrical signal to actuator means for reducing drive power of a drive system to enable synchronizing the wheel speeds associated with a longitudinal differential positioned on said commercial-type vehicle.

25. An apparatus, according to claim 13, wherein during acceleration of said commercial-type vehicle, said electronic system furnishes an electrical signal for reducing drive power of a drive system to enable synchronizing the wheel speeds associated with a longitudinal differential positioned on said commercial-type vehicle.

26. An apparatus, according to claim 19, wherein during acceleration of said commercial-type vehicle, said electronic system furnishes an electrical signal to actuator means for reducing drive power of a drive system to enable synchronizing the wheel speeds associated with a longitudinal differential positioned on said commercial-type vehicle.

27. An apparatus, according to claim 1, wherein said electronic system furnishes an electrical signal to actuator means for both synchronizing the wheel speeds associated with a longitudinal differential positioned on said commercial-type vehicle and subsequently locking said longitudinal differential only at a vehicle speed which is less than a specified limit value.

28. An apparatus, according to claim 19, wherein said electronic system furnishes an electrical signal to actuator means for both synchronizing the wheel speeds associated with a longitudinal differential positioned on said commercial-type vehicle and subsequently locking said longitudinal differential only at a vehicle speed which is less than a specified limit value.

29. An apparatus, according to claim 26, wherein said electronic system furnishes an electrical signal to actuator means for both synchronizing the wheel speeds associated with a longitudinal differential positioned on said commercial-type vehicle and subsequently locking said longitudinal differential only at a vehicle speed which is less than a specified limit value.

30. An apparatus, according to claim 27, wherein said specified limit value is about 30 km/h.

31. An apparatus, according to claim 1, wherein during braking, said electronic system furnishes electrical signals to actuator means for synchronizing the wheel speeds associated with a longitudinal differential positioned on said commercial-type vehicle by regulating a reduction in brake pressure.

32. An apparatus, according to claim 2, wherein during braking, said electronic system furnishes electrical signals to actuator means for synchronizing the wheel speeds associated with a longitudinal differential positioned on said commercial-type vehicle by regulating a reduction in brake pressure.

33. An apparatus, according to claim 5, wherein during braking, said electronic system furnishes electrical signals to actuator means for synchronizing the wheel speeds associated with a longitudinal differential positioned on said commercial-type vehicle by regulating a reduction in brake pressure.

34. An apparatus, according to claim 8, wherein during braking, said electronic system furnishes electrical signals to actuator means for synchronizing the wheel speeds associated with a longitudinal differential positioned on said commercial-type vehicle by regulating a reduction in brake pressure.

35. An apparatus, according to claim 10, wherein during, said braking, said electronic system furnishes electrical signals to actuator means for synchronizing the wheel speeds associated with a longitudinal differential positioned on said commercial-type vehicle by regulating a reduction in brake pressure.

36. An apparatus, according to claim 13, wherein during braking, said electronic system furnishes electrical signals to actuator means for synchronizing the wheel speeds associated with a longitudinal differential positioned on said commercial-type vehicle by regulating a reduction in brake pressure.

37. An apparatus, according to claim 1, wherein said electronic system furnishes an electrical signal to actuator means to effectuate a locking of a longitudinal differential positioned on said commercial-type vehicle which is effective only for a fixed period of time.

38. An apparatus, according to claim 2, wherein said electronic system furnishes an electrical signal to actuator means effectuate a locking of a longitudinal differential positioned on said commercial-type vehicle which is effective only for a fixed period of time.

39. An apparatus, according to claim 5, wherein said electronic system furnishes an electrical signal to actuator means to effectuate a locking of a longitudinal differential positioned on said commercial-type vehicle which is effective only for a fixed period of time.

40. An apparatus, according to claim 8, wherein said electronic system furnishes an electrical signal to actuator means to effectuate a locking of a longitudinal differential positioned on said commercial-type vehicle which is effective only for a fixed period of time.

41. An apparatus, according to claim 10, wherein said electronic system furnishes an electrical signal to actuator means to effectuate a locking of a longitudinal differential positioned on said commercial-type vehicle which is effective only for a fixed period of time.

42. An apparatus, according to claim 12, wherein said electronic system furnishes an electrical signal to actuator means to effectuate a locking of a longitudinal differential positioned on said commercial-type vehicle which is effective only for a fixed period of time.

43. An apparatus, according to claim 13, wherein said electronic system furnishes an electrical signal to actuator means to effectuate a locking of a longitudinal differential positioned on said commercial-type vehicle which is effective only for a fixed period of time.

44. An apparatus, according to claim 19, wherein said electronic system furnishes an electrical signal to actuator means to effectuate a locking of a longitudinal differential positioned on said commercial-type vehicle which is effective only for a fixed period of time.

45. An apparatus, according to claim 29, wherein said electronic system furnishes an electrical signal to actuator means to effectuate a locking of a longitudinal differential positioned on said commercial-type vehicle which is effective only for a fixed period of time.

46. An apparatus, according to claim 30, wherein said electronic system furnishes an electrical signal to actuator means to effectuate a locking of a longitudinal differential positioned on said commercial-type vehicle which is effective only for a fixed period of time.

47. An apparatus, according to claim 36, wherein said electronic system furnishes an electrical signal to said actuator means to effectuate a locking of a longitudinal differential positioned on said commercial-type vehicle which is effective only for a fixed period of time.

48. An apparatus, according to claim 37, wherein said locking of said longitudinal differential on said commercial-type vehicle is effective until an end of a current braking process.

49. An apparatus, according to claim 48, wherein during said locking of said longitudinal differential, said electronic system furnishes an electrical signal to said actuator means which activates an alarm means positioned in said cab of said commercial-type vehicle.

50. An apparatus, according to claim 1, wherein said means positioned on said commercial-type vehicle for determining an average rotational speed of said wheels mounted on said second predetermined one of said pair of rear drive axles and for furnishing electrical signal having a value that is representative of said average rotational speed is a tachometer.

51. An apparatus, according to claim 1, wherein said means positioned on said commercial-type vehicle for determining an average rotational speed of said wheels mounted on said second predetermined one of said pair of rear drive axles and for furnishing an electrical signal, having a value that is representative of said average rotational speed, monitors the average rotational speed of said wheels mounted on said second predetermined one of said pair of rear drive axles in a vicinity of an axle differential.

* * * * *